(12) United States Patent
Susai et al.

(10) Patent No.: US 8,154,989 B1
(45) Date of Patent: Apr. 10, 2012

(54) RECOVERING A SHARED CHANNEL WITHIN A NETWORK FROM A DEADLOCK STATE

(75) Inventors: Robert Bellarmin Susai, Hyderabad (IN); Venkata Vamsi Krishna Dhanikonda, Secunderabad (IN)

(73) Assignee: Xilinx, Inc., San Jose, CA (US)

( * ) Notice: Subject to any disclaimer, the term of this patent is extended or adjusted under 35 U.S.C. 154(b) by 507 days.

(21) Appl. No.: 12/122,217

(22) Filed: May 16, 2008

(51) Int. Cl.
*G01R 31/08* (2006.01)
*H04Q 11/00* (2006.01)
(52) U.S. Cl. ......... 370/216; 370/452; 370/461; 370/462
(58) Field of Classification Search .......... 370/229–235, 370/395.1, 398, 422, 389, 394, 395.42, 400, 370/410–412, 438, 439–440, 443, 445, 447, 370/458, 459, 460–461, 462–522
See application file for complete search history.

(56) References Cited

U.S. PATENT DOCUMENTS

| | | | | |
|---|---|---|---|---|
| 4,566,098 A | * | 1/1986 | Gammage et al. | 370/452 |
| 4,587,651 A | * | 5/1986 | Nelson et al. | 370/405 |
| 5,886,992 A | * | 3/1999 | Raatikainen et al. | 370/410 |
| 6,683,851 B1 | * | 1/2004 | Willkie et al. | 370/235 |
| 7,050,440 B2 | * | 5/2006 | Colmant et al. | 370/395.1 |
| 7,305,487 B2 | * | 12/2007 | Blumrich et al. | 709/238 |
| 2004/0047327 A1 | * | 3/2004 | Chen | 370/342 |
| 2005/0105662 A1 | * | 5/2005 | Margules | 375/376 |
| 2007/0064735 A1 | | 3/2007 | Hoo et al. | |

OTHER PUBLICATIONS

U.S. Appl. No. 12/122,224, filed May 16, 2008, Susai et al.

* cited by examiner

*Primary Examiner* — Seema S Rao
*Assistant Examiner* — Samina Choudhry
(74) *Attorney, Agent, or Firm* — Kevin T. Cuenot; LeRoy D. Maunu

(57) ABSTRACT

A method of processing data within a controller for a network can include identifying frames within a data stream within the network (1110) and detecting a deadlock state according to a number of consecutive frames comprising at least one set control bit (1130). The method can include, responsive to detecting the deadlock state, adjusting the at least one control bit within a current frame (1135). Adjusting the at least one control bit clears the deadlock state and generates a modified frame. The modified frame can be output to at least one node within the network (1140).

20 Claims, 5 Drawing Sheets

RECOVERING A SHARED CHANNEL WITHIN A NETWORK FROM A DEADLOCK STATE

FIELD OF THE INVENTION

The embodiments disclosed herein relate to recovering a shared channel within a network from a deadlock state. More particularly, the embodiments disclosed herein relate to recovering a shared channel within a Media Oriented Systems Transport network from a deadlock state.

BACKGROUND OF THE INVENTION

Media Oriented Systems Transport (MOST) is a network configuration that employs a ring topology. MOST was developed for use within automobiles and is intended to provide a robust networking solution able to withstand the harsh operating environment that is characteristic of automobiles. MOST enables the seamless transport of digital audio, video, packet-based data, and control information among multiple nodes in the network.

The MOST specification, for example version 2.4 as promulgated by the Most Cooperation of Karlsruhe, Germany, defines all seven layers of the ISO/OSI Reference Model for data communication. Within a MOST network, a Timing Master node (master) continuously feeds frames of data into the network or acts as a gate for data. The master generates frames of data at a rate that supports playback of CD quality audio, DVD encoded video, and/or multimedia content within the MOST network. Other nodes within the MOST network are timing slave nodes that are synchronized by a preamble, which is located within a header portion of the frames.

Within a MOST network, data is organized into frames of 64 bytes. The frames are organized into blocks of 16 frames. The blocks are organized into super blocks of 64 blocks. Each frame is subdivided into different segments. For example, each frame will include, among other data, a header, one or more control bits, a synchronous field, and an asynchronous field. The asynchronous field will typically include packet data that is to be distributed throughout the network. Large packets of data, however, may not fit within the asynchronous field of a single frame. In such cases, it becomes necessary to divide the packet into several smaller sub-packets to be sent within multiple frames.

For example, consider the case where a packet is subdivided into five smaller sub-packets and each sub-packet is inserted into the asynchronous field within one of five different frames. These five frames may be consecutively transmitted through the MOST network. A receiving node within the MOST network can assemble the packet by extracting the sub-packets from each of the five frames.

Nodes transmit information within the MOST network by obtaining the right to insert data into the asynchronous field of one or more frames. In this regard, the frame and/or asynchronous field may be referred to as a "shared channel" in that the asynchronous field can be made available to any node within the MOST network. For a node to insert data into the asynchronous field, the shared channel first must become available or free. From time to time, whether due to data corruption or malfunction of a node, the asynchronous field does not become available, e.g., is not released. The result is as if one node is monopolizing the shared channel. This creates a deadlock state where no other node within the MOST network is able to take control of the shared channel and transmit data.

SUMMARY OF THE INVENTION

The embodiments disclosed herein relate to a network interface controller (controller) for use with a Media Oriented Systems Transport (MOST) network. One embodiment of the present invention can include a method of recovering a shared channel from a deadlock state within a network. The method can include identifying frames within a data stream within the network and detecting a deadlock state according to a number of consecutive frames within the data stream including at least one control bit indicating a busy state. Responsive to detecting the deadlock state, the control bit(s) within a current frame within the data stream can be adjusted. Adjusting the control bit(s) can clear the deadlock state and generate, or result in, a modified frame. The modified frame can be output to one or more nodes within the network.

Detecting a deadlock state can include determining a frame count by counting consecutive frames including a set bundle bit and determining whether the frame count exceeds a maximum allowed number of frames. The frame count can be initialized responsive to identifying a frame including a cleared bundle bit.

The method also can include determining that the frame count exceeds the maximum allowed number of frames, clearing the bundle bit within the current frame, and initializing the frame count. The method also can include clearing an arbitration bit within the current frame.

Identifying frames within a data stream within the network can include detecting a first preamble and a second preamble separated by a number of biphase units that corresponds to a frame, determining that no biphase coding violation exists between the first preamble and the second preamble, and acquiring frame lock on the data stream.

Identifying frames within a data stream within the network also can include determining a count of bits and detecting frame boundaries when the count of bits reaches a number corresponding to a number of bits within a frame.

Another embodiment of the present invention can include a controller that recovers a shared channel from a deadlock state within a network. The controller can include a counter that counts bits within a data stream within the network and a control bit extraction module identifying a state of a first control bit within frames within the data stream. The controller can include a diagnostic circuit determining a number of consecutive frames including the first control bit indicating a busy state. The diagnostic circuit can compare the number of consecutive frames with a predetermined threshold number of frames.

The controller also can include a recovery circuit. Responsive to the number of consecutive frames exceeding the predetermined threshold number of frames, the recovery circuit can generate a modified frame from a selected frame by adjusting the first control bit and a second control bit within the selected frame to indicate a free state. The controller further can include a biphase encoder that biphase encodes the modified frame and a multiplexer that selectively outputs the biphase encoded, modified frame to one or more nodes within the network.

The recovery circuit can generate a control signal that controls whether the multiplexer passes the biphase encoded, modified frame or the selected frame. The recovery circuit can cause the multiplexer to output the modified frame responsive to adjusting the first control bit and the second control bit to generate the modified frame. The recovery circuit can generate the modified frame to include the arbitration bit as the second control bit.

When the controller is frame locked, the control bit extraction module can determine a location of the control bit within each frame according to a count of bits determined by the counter. The first control bit can be a bundle bit and the second control bit can be an arbitration bit.

Another embodiment of the present invention can include a computer program product including a computer-usable medium having computer-usable program code that, when executed by a data processing system, causes the data processing system to perform the various steps and/or functions disclosed herein.

Yet another embodiment of the present invention can include a computer program product including a computer-usable medium having computer-usable program code that, when implemented within a programmable integrated circuit, causes the programmable integrated circuit to perform the various steps and/or functions disclosed herein.

DETAILED DESCRIPTION

Figure 1:
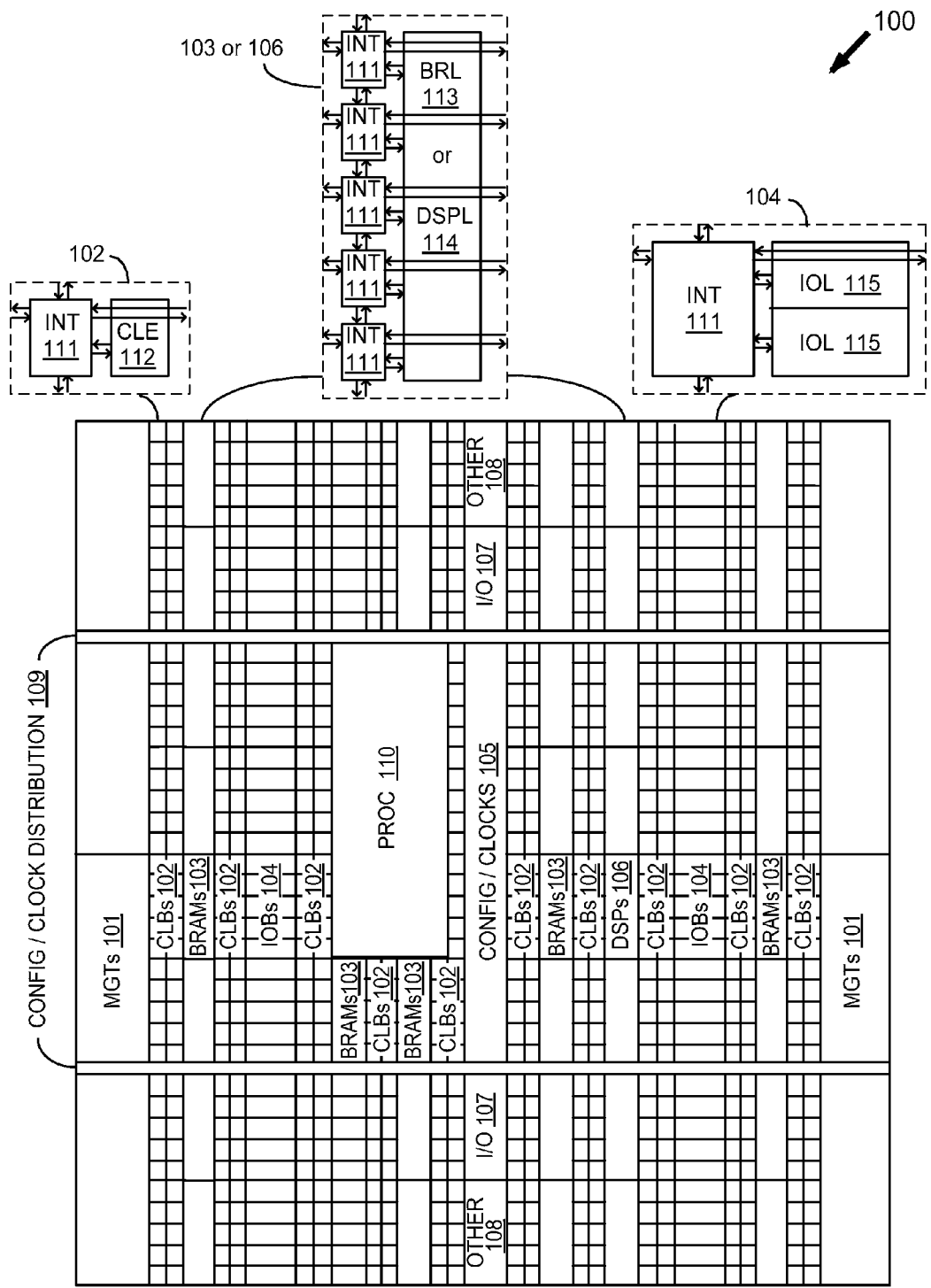
FIG. 1 is a first block diagram illustrating an architecture for a field programmable gate array that can be used to implement a network interface controller (controller) for use within a Media Oriented Systems Transport (MOST) network in accordance with one embodiment of the present invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

The embodiments disclosed herein relate to recovering a shared channel within a network from a deadlock state. More particularly, the embodiments disclosed herein relate to recovering a shared channel within a Media Oriented Systems Transport (MOST) network from a deadlock state. In accordance with the embodiments disclosed herein, a network interface controller (hereafter "controller") can detect a deadlock state within a MOST network. Responsive to detecting the deadlock state, the controller can clear the deadlock state, thereby allowing other nodes within the MOST network to utilize the shared channel.

The embodiments disclosed herein can be implemented within a programmable integrated circuit (IC). Programmable ICs can be programmed to perform specified logic functions. One type of programmable IC, the field programmable gate array (FPGA), typically includes an array of programmable tiles. Other types of programmable ICs can include Complex Programmable Logic Devices (CPLDs), Programmable Logic Arrays (PLAs), and Programmable Array Logic (PAL) devices. For all of these programmable ICs, the functionality of the device is controlled by data bits provided to the device for that purpose. The data bits can be stored in volatile memory (e.g., static memory cells, as in FPGAs and some CPLDs), in non-volatile memory (e.g., FLASH memory, as in some CPLDs), or in any other type of memory cell and/or other computer-usable medium.

Other programmable ICs are programmed by applying a processing layer, such as a metal layer, that programmably interconnects the various elements on the device. These programmable ICs are known as mask programmable devices. Programmable ICs can also be implemented in other ways, e.g., using fuse or antifuse technology. The term "programmable IC" can refer to the devices disclosed herein as well as devices that are only partially programmable. For example, one type of programmable IC includes a combination of hard-coded transistor logic and a programmable switch fabric that programmably interconnects the hard-coded transistor logic.

An FPGA will be used throughout this specification, by way of example, to better illustrate the various embodiments of the present invention. It should be appreciated, however, that the embodiments disclosed herein can be applied to, or implemented within, other types of programmable ICs as discussed within this specification.

FIG. 1 is a first block diagram illustrating an architecture 100 for an FPGA that can be used to implement a controller for use within a MOST network in accordance with one embodiment of the present invention. An FPGA can include several different types of programmable logic blocks in the array. For example, FIG. 1 illustrates an FPGA architecture 100 that includes a large number of different programmable tiles including multi-gigabit transceivers (MGTs) 101, configurable logic blocks (CLBs) 102, random access memory blocks (BRAMs) 103, input/output blocks (IOBs) 104, configuration and clocking logic (CONFIG/CLOCKS) 105, digital signal processing blocks (DSPs) 106, specialized input/output blocks (I/O) 107 (e.g., configuration ports and clock ports), and other programmable logic 108 such as digital clock managers, analog-to-digital converters, system monitoring logic, and so forth. Some FPGAs also include dedicated processor blocks (PROC) 110.

In some FPGAs, each programmable tile includes a programmable interconnect element (INT) 111 having standardized connections to and from a corresponding interconnect element in each adjacent tile. Therefore, the programmable interconnect elements taken together implement the programmable interconnect structure for the illustrated FPGA. The programmable interconnect element INT 111 also includes the connections to and from the programmable logic element within the same tile, as shown by the examples included at the top of FIG. 1.

For example, a CLB 102 can include a configurable logic element (CLE) 112 that can be programmed to implement user logic plus a single programmable interconnect element INT 111. A BRAM 103 can include a BRAM logic element (BRL) 113 in addition to one or more programmable interconnect elements. Typically, the number of interconnect elements included in a tile depends on the height of the tile. In the pictured embodiment, a BRAM tile has the same height as five CLBs, but other numbers (e.g., four) can also be used. A DSP tile 106 can include a DSP logic element (DSPL) 114 in addition to an appropriate number of programmable interconnect elements. An IOB 104 can include, for example, two instances of an input/output logic element (IOL) 115 in addition to one instance of the programmable interconnect element INT 111. As will be clear to those of skill in the art, the actual I/O pads connected, for example, to the I/O logic element 115 typically are not confined to the area of the I/O logic element 115.

In the pictured embodiment, a columnar area near the center of the die (shown shaded in FIG. 1) is used for configuration, clock, and other control logic. Horizontal areas 109 extending from this column are used to distribute the clocks and configuration signals across the breadth of the FPGA.

Some FPGAs utilizing the architecture illustrated in FIG. 1 include additional logic blocks that disrupt the regular columnar structure making up a large part of the FPGA. The additional logic blocks can be programmable blocks and/or dedicated logic. For example, the processor block PROC 110 shown in FIG. 1 spans several columns of CLBs and BRAMs.

FIG. 1 is intended to illustrate only an exemplary FPGA architecture. For example, the number of logic blocks in a column, the relative width of the columns, the number and order of columns, the types of logic blocks included in the columns, the relative sizes of the logic blocks, and the interconnect/logic implementations included at the top of FIG. 1 are purely exemplary. In an actual FPGA, more than one adjacent column of CLBs may be included wherever the CLBs appear, to facilitate the efficient implementation of user logic. The number of adjacent CLB columns can vary with the overall size of the FPGA.

Figure 2:
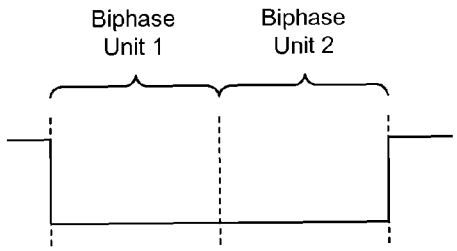
FIG. 2 is a first signal diagram illustrating biphase encoding of a zero bit within a MOST network when the prior biphase unit is high.

FIG. 2 is a first signal diagram illustrating biphase encoding of a zero bit within a MOST network when the prior biphase unit is high. In general, a zero bit is encoded by keeping the signal constant, e.g., either low or high, for two consecutive biphase units. Each bit is set off from each other bit within the data stream by a transition from either low to high or from high to low. Accordingly, when the biphase unit immediately preceding a zero bit is high, as pictured in FIG. 2, the zero bit is encoded by transitioning the signal from high to low at the bit boundary. The signal remains low for two consecutive biphase units. As shown, the signal remains low through both of biphase units 1 and 2.

Figure 3:
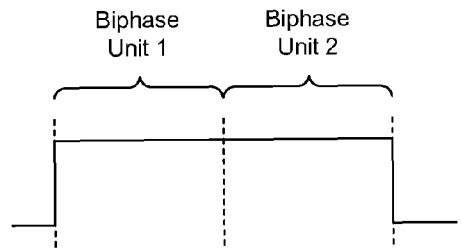
FIG. 3 is a second signal diagram illustrating biphase encoding of a zero bit within a MOST network when the prior biphase unit is low.

FIG. 3 is a second signal diagram illustrating biphase encoding for a zero bit within a MOST network when the prior biphase unit is low. When the biphase unit immediately preceding the zero bit is low, the zero bit can be encoded by transitioning the signal from low to high at the bit boundary. The signal remains high for two consecutive biphase units, e.g., throughout both of biphase units 1 and 2.

Figure 4:
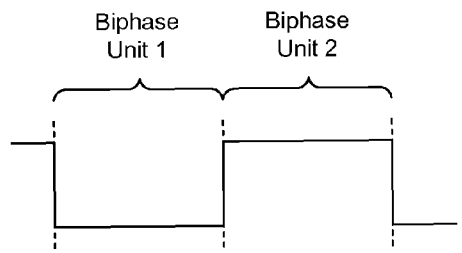
FIG. 4 is a third signal diagram illustrating biphase encoding of a one bit within a MOST network when the prior biphase unit is high.

FIG. 4 is a third signal diagram illustrating biphase encoding for a one bit within a MOST network when the prior biphase unit is high. In general, a one bit is encoded using one biphase unit that is high and another biphase unit that is low. Whether the signal begins high and transitions low or begins low and transitions high will depend upon the biphase unit immediately preceding the one bit. When the biphase unit immediately preceding the one bit is high, the one bit can be encoded by transitioning the signal from high to low at the bit boundary. The signal remains low throughout biphase unit 1. The signal then transitions high and remains high throughout biphase unit 2.

Figure 5:
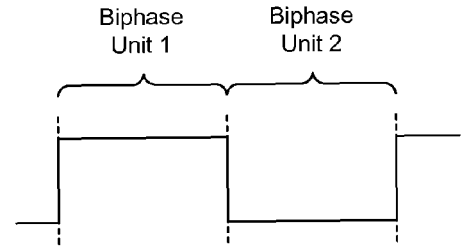
FIG. 5 is a fourth signal diagram illustrating biphase encoding of a one bit within a MOST network when the prior biphase unit is low.

FIG. 5 is a fourth signal diagram illustrating biphase encoding for a one bit within a MOST network when the prior biphase unit is low. When the biphase unit immediately preceding the one bit is low, the one bit can be encoded by transitioning the signal from low to high at the bit boundary and remaining high throughout biphase unit 1. The signal then can transition low and remain low throughout biphase unit 2.

Figure 6:
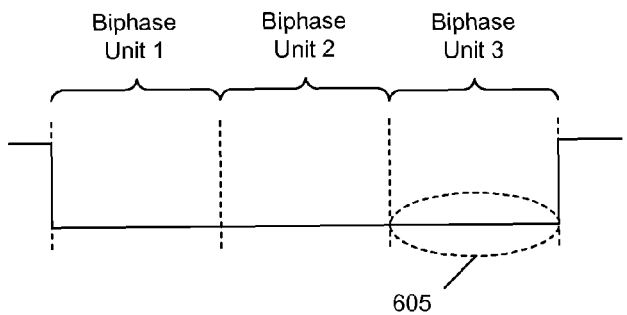
FIG. 6 is a fifth signal diagram illustrating an example of a biphase coding violation.

FIG. 6 is a fifth signal diagram illustrating an example of a biphase coding violation. As noted, to demarcate bits within the data stream of a MOST network, the signal transitions from either high to low or from low to high at the beginning of each biphase unit pair that encodes a bit, e.g., at each bit boundary. When the signal remains constant, e.g., either high or low, for more than two consecutive biphase units, or does not transition at a bit boundary, a biphase coding violation results. FIG. 6 illustrates the case where the signal remains low throughout biphase units 1, 2, and 3. Portion 605 of the signal violates the biphase encoding scheme.

Figure 7:
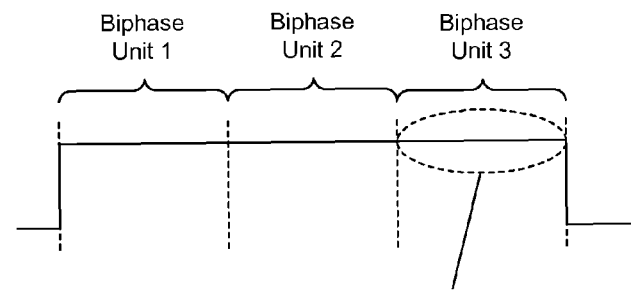
FIG. 7 is a sixth signal diagram illustrating another example of a biphase coding violation.

FIG. 7 is a sixth signal diagram illustrating another example of a biphase coding violation. Whereas FIG. 6 illustrates a biphase coding violation with the signal low, FIG. 7 illustrates a biphase coding violation with the signal high. As shown, the signal remains high throughout biphase units 1, 2, and 3. Portion 705 of the signal violates the biphase coding scheme.

As noted, a biphase coding violation also occurs when the signal remains constant across the boundary between two biphase encoded bits. The signal must transition between the second biphase unit of an encoded bit and the first biphase unit of a next encoded bit. Thus, the biphase unit sequences 1001 and 0110 are also examples of biphase coding violations where the signal does not transition between the second and third biphase units, which correspond to the boundary between two biphase encoded bits.

Figure 8:
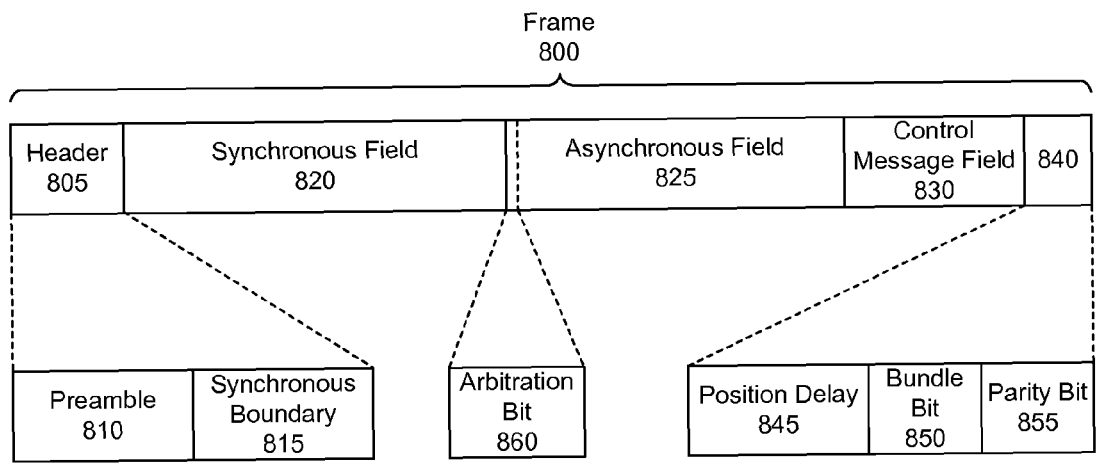
FIG. 8 is a second block diagram illustrating a frame within a data stream of a MOST network.

FIG. 8 is a second block diagram illustrating a frame 800 within a data stream of a MOST network. Each frame, such as frame 800, within a data stream of a MOST network is composed of 64 bytes. Each frame includes a one byte header, such has header 805. Header 805 can be subdivided into a preamble 810 and a synchronous boundary 815. The preamble 810, which is four bits in length, generally marks a boundary that divides one frame from another frame. Each preamble, such as preamble 810, will include a particular bit pattern identifying that portion of the frame as a preamble. For example, a preamble may include special encoding, e.g., a biphase coding violation or a predetermined bit pattern, that allows each node within the MOST network to identify that portion of the frame as a preamble.

A data stream within a MOST network will include several different types of preambles. For example, such a data stream can include frame preambles, block preambles, super block preambles, and wakeup preambles. Each frame preamble is used to set off one frame from another and is, therefore, located at a frame boundary. As noted, each frame is 64 bytes. Accordingly, each frame boundary will occur at 64 byte intervals within the data stream. In general, each frame preamble will occur at each frame boundary, except as noted herein. The block preamble is used to set off one block from another and is located at a block boundary. Each block includes 16 frames. Accordingly, each block boundary will occur at 16 frame intervals within the data stream. In general, each block preamble will occur at each block boundary except as noted herein.

When a block preamble is expected within the data stream, the block preamble can be used in lieu of, e.g., replace, a frame preamble. The super block preamble sets off one super block from another and is located at a super block boundary. A super block includes 64 blocks. At the boundary of a super block within the data stream, a super block preamble can replace a block preamble. A wakeup preamble also can replace a super block preamble. A super block boundary will occur at 64 block intervals within the data stream. In general, a super block preamble will occur at each super block boundary, except as noted herein.

The synchronous boundary 815, which is also four bits in length, indicates the beginning of synchronous field 820 and further specifies the length of the synchronous field 820 and the length of the asynchronous field 825 within frame 800. The synchronous field 820 may be as large as 60 bytes, with the asynchronous field 825 being zero bytes. Similarly, the synchronous field 820 may be as small as zero bytes with the asynchronous field 825 being as large as 60 bytes.

As pictured, frame 800 further can include a control message field 830 and a trailer field 840. The trailer field 840 can be one byte in length and include a six bit position delay field 845, a single bundle bit 850, and a single parity bit 855. The bundle bit 850 can indicate when the asynchronous field 825 includes packet data that corresponds to a prior frame. More particularly, when packet data is subdivided into a plurality of sub-packets and transmitted using a plurality of frames, the bundle bit 850 can be set.

For example, consider the case where a packet is subdivided into five sub-packets and transmitted using five consecutive frames. Within each of the first four frames used to send the sub-packets, the bundle bit 850 can be set, e.g., set to a one bit. Setting the bundle bit 850 indicates that each frame with the bundle bit 850 set is part of a plurality of consecutive frames carrying data sub-packets, e.g., a portion of data corresponding to a single packet of data. The last of the five frames will have the bundle bit 850 cleared, e.g., set low or to a zero bit. The cleared bundle bit 850 indicates that the fifth frame is the last of the frames carrying sub-packet data needed to reconstruct the packet of data that has been sent using the five consecutive frames. From this example, when the asynchronous field 825 is occupied, the shared channel can be said to be busy or in use. The shared channel is not free. The bundle bit 850 will be set to indicate this condition. Only in the last frame used to send a packet of data will the bundle bit 850 be cleared indicating that the frame to follow is free, e.g., the shared channel is to be released.

The asynchronous field 825 can include an arbitration bit 860. The arbitration bit 860 can indicate when the asynchronous field 825 is being used. For example, when the asynchronous field 825 is occupied, the arbitration bit 860 will be set high. The arbitration bit 860 exists and is set high only in the first frame of a set of consecutive frames carrying sub-packets corresponding to a single packet of data. Continuing with the prior example, the arbitration bit 860 would exist and be set high only in the first of the five frames used to carry the data for the packet. Frames two through five would not include an arbitration bit 860. In frames two through five, the sub-packet data can occupy that portion of the frame otherwise occupied by the arbitration bit 860.

Accordingly, the shared channel is free, e.g., the asynchronous field 825 is available for use by a node, when the bundle bit 850 of the previous frame is cleared and the arbitration bit 860 of the current frame, e.g., the frame immediately following the previous frame with the cleared bundle bit 850, is cleared or set to zero. Under this condition, when the bundle bit 850 of a frame and the arbitration bit of a next frame are cleared, a node of the MOST network may acquire control of the shared channel.

Figure 9:
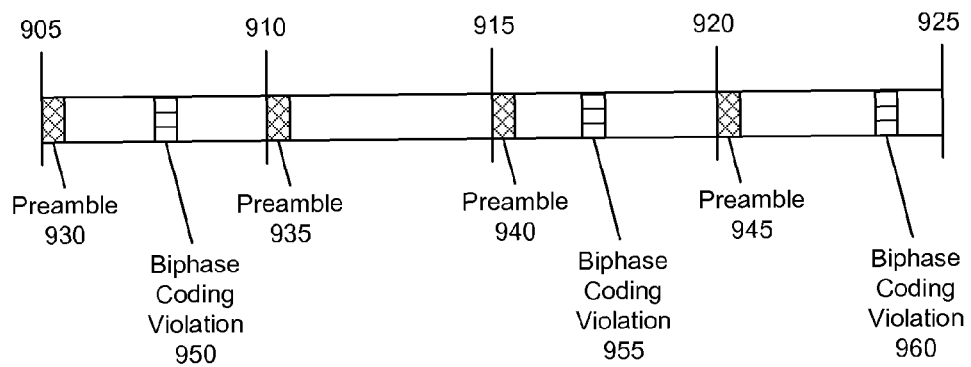
FIG. 9 is a third block diagram illustrating the detection of preambles within a data stream of a MOST network in accordance with another embodiment of the present invention.

FIG. 9 is a third block diagram illustrating the detection of preambles within a data stream 900 of a MOST network in accordance with another embodiment of the present invention. More particularly, FIG. 9 illustrates a technique for acquiring frame lock that can be used within a controller configured in accordance with the embodiments of the present invention. FIG. 9 illustrates that once the controller acquires frame lock, biphase coding violations can be handled in a manner that does not cause the controller to lose frame lock on the data stream.

As shown, each frame boundary 905, 910, 915, 920, and 925 of the data stream 900 is indicated or identified through the existence of a preamble, e.g., preambles 930, 935, 940, and 945. In one embodiment, the controller can acquire frame lock only after detecting two consecutive preambles that are separated by a number of biphase units or bits corresponding to a frame. Further, frame lock is only acquired after the second of the two consecutive preambles is detected without any intervening biphase coding violations having been detected between the first preamble and the second preamble.

While monitoring the data stream 900, the controller can detect preamble 930. The controller next can detect biphase coding violation 950. Subsequently, the controller can detect preamble 935. Although preambles 930 and 935 may each be located at a frame boundary, e.g., separated by 1024 biphase units or 512 bits, the controller does not acquire frame lock on the data stream 900 due to the existence of intervening biphase coding violation 950.

The controller can continue monitoring data stream 900 after detection of preamble 935. The controller can detect preamble 940 after preamble 935 and further determine that preambles 935 and 940 are separated by a number of biphase units that corresponds to a frame, e.g., 1024. In this case, because no biphase coding violation is detected between preambles 935 and 940, e.g., no intervening biphase coding violation is detected, the controller can acquire frame lock on the data stream 900. Responsive to acquiring frame lock, a synchronization signal can be output or changed, e.g., toggled from low to high or from high to low as the case may be, to indicate that the controller has acquired frame lock on data stream 900.

As used herein, "outputting" and/or "output" can mean, for example, writing to a file, writing to a user display or other output device, playing audible notifications, sending or transmitting signals to another system or node within a network, exporting, generating a signal, or the like. In the present specification, the same reference characters may be used to refer to terminals, signal lines, wires, and their corresponding signals. Accordingly, the terms "signal," "wire," "connection," "terminal," and "pin" may be used interchangeably, from time-to-time, within the present specification.

By not acquiring frame lock until two consecutive preambles separated by 1024 biphase units are detected without any intervening biphase coding violations, a more robust and persistent synchronization can be achieved. The controller can continue to count the number of biphase units that occur between consecutive preambles to better distinguish between valid preambles, invalid preambles, and biphase coding violations. Once frame lock is acquired, counting biphase units helps to ensure that invalid preambles, e.g., preambles not located at a frame boundary, or biphase coding violations do not cause the controller to lose frame lock on data stream 900.

For example, after detecting preamble 940, the controller can detect biphase coding violation 955. Since a biphase unit count maintained by the controller will not be at 1024 (or a bit count will not be at 512) when biphase coding violation 955 is detected, the controller can ignore biphase coding violation 955. In another embodiment, an error correction technique can be applied in cases where a biphase coding violation such as biphase coding violation 955 is detected within a frame of the data stream, e.g., not at frame boundary 920. In any case, the controller can maintain frame lock on data stream 900 according to preamble 940.

The controller can continue to monitor data stream 900 and detect preamble 945. Preamble 945 will be detected when the biphase unit count is 1024, corresponding to frame boundary 920. Accordingly, the controller will maintain frame lock. When biphase coding violation 960 is detected, again, the biphase unit count will not be 1024 as biphase coding violation 960 occurs within the frame and not at frame boundary 925. Again, the biphase coding violation 960 can be ignored for purposes of synchronization and optionally be corrected.

Conventional nodes detect biphase coding violations and mistakenly presume such biphase coding violations to be preambles. This causes conventional controllers to lose frame lock. In order for nodes within a MOST network to operate at full functionality, each node must not only maintain frame lock, but also maintain block lock and super block lock. When frame lock is lost, the synchronization error is propagated through the nodes in the MOST network, causing each node to lose synchronization. When frame lock is lost, any other level of synchronization, e.g., block lock or super block lock, also will be lost.

The time required for conventional nodes to reacquire synchronization at all necessary levels, e.g., frame, block, and super block, can be time consuming and processing resource intensive. While this occurs, the end user typically experiences a drop out in video, audio, or the particular media or content that is currently being played or distributed over the MOST network.

The embodiments disclosed herein can employ a counter, e.g., a biphase unit counter and/or a bit counter, to determine the location, with respect to frame boundaries, of any biphase coding violations that may be detected. When biphase coding violations are detected in a location that does not correspond to a frame boundary, such biphase coding violations can be ignored or corrected. A controller configured in accordance with the embodiments disclosed herein will not lose frame lock upon detecting biphase coding violations presuming that two consecutive preambles have been detected that are separated by 1024 biphase units without any intervening biphase coding violations. By enforcing this restriction, synchronization can be achieved without false starts, e.g., first attempting to synchronize to a biphase coding violation that is not a valid preamble. The controller further can acquire block lock and super block lock by detecting or identifying appropriate, e.g., legal, preambles at block and super block boundaries respectively.

It should be appreciated that the example illustrated with respect to FIG. 9 is also applicable when a preamble is detected within a frame, but not at a frame boundary. That is, a preamble detected at a location that is not a frame boundary is likely a data corruption that coincidentally resembles one of the predefined preambles described herein. In that regard, the preamble can be ignored for purposes of synchronizing and optionally be processed through an error correction technique.

Figure 10:
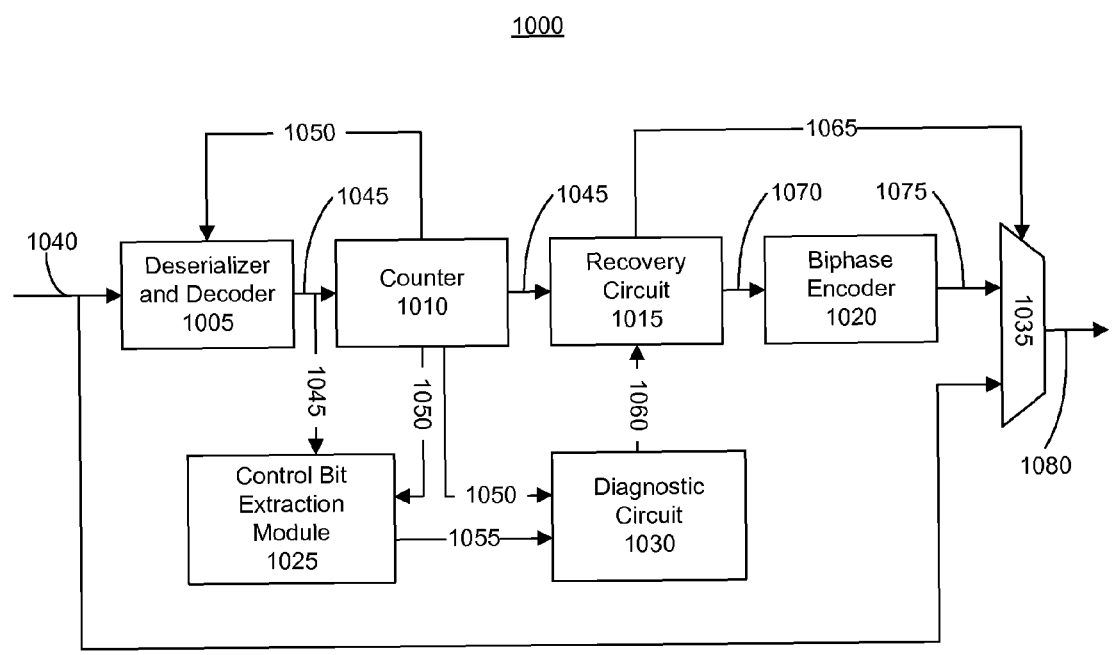
FIG. 10 is a fourth block diagram illustrating a controller for a MOST network in accordance with another embodiment of the present invention.

FIG. 10 is a fourth block diagram illustrating a controller 1000 for a MOST network in accordance with another embodiment of the present invention. The controller can monitor the data stream within a MOST network and detect deadlock states within the MOST network. Once a deadlock state is detected, the controller can modify one or more frames to release the shared channel and remove the deadlock state.

To detect a deadlock state, the controller is assumed to have acquired frame lock or be fully synchronized with the MOST data stream, e.g., have acquired frame, block, and super block lock. While a technique as described herein can be used to acquire frame lock, it should be appreciated that any known technique for establishing frame lock or acquiring full synchronization with the MOST data stream can be used and that the embodiments disclosed herein are not intended to be limited for use with any one particular type or technique of acquiring frame lock and/or synchronization with the MOST data stream.

The controller 1000 allows a deadlock state to be detected and cleared at a layer of the MOST specification that is lower than with conventional techniques. Conventional techniques for detecting deadlock states tend to be software-driven. This means that detecting and recovering from a deadlock state may require the entire network to be interrupted, e.g., brought down, and then brought back up. As noted, processes such as acquiring frame lock, block lock, super block lock, or all three, within conventional systems, can be time consuming and resource intensive. By detecting deadlock states at the hardware level, e.g., using controller 1000, a deadlock state can be detected and corrected seamlessly through the modification of one or more frames as will be described in greater detail herein. Recovery from the deadlock state can be achieved without interrupting the network or bringing the network down for a period of time. This allows the network to continue operation without nodes having to reacquire full synchronization.

The controller 1000 can be implemented within a programmable IC such as an FPGA or the like. In this regard, the controller 1000 also may be implemented in the form of, or specified as, a "core." A core refers to a block that has a pre-designed functionality. For example, a core can include a predetermined set of configuration bits that program a programmable IC to implement a circuit design, or a portion of a circuit design, to perform one or more functions as described herein. Alternatively, a core can include source code or schematics that describe the logic and connectivity of a design or portion of a design that implements the various tasks and/or functions described herein. Typical cores can provide, for example, digital signal processing (DSP) functions, memories, storage elements, and math functions. Some cores include an optimally floorplanned layout targeted to a specific family of programmable ICs. Cores can also be parameterizable, i.e., allowing the user to enter parameters to activate or change certain core functionality.

As shown, the controller 1000 can include a deserializer and decoder 1005, a counter 1010, a recovery circuit 1015, and a biphase encoder 1020. The controller 1000 further can include a control bit extraction module 1025, a diagnostic circuit 1030, and a multiplexer 1035. The deserializer and decoder 1005 can receive a signal 1040. Signal 1040 can be biphase encoded signal specifying a serial, MOST data stream. As shown, signal 1040 also is provided to the multiplexer 1035.

The deserializer and decoder 1005 can transform signal 1040 into signal 1045. More particularly, the deserializer and decoder 1005 can decode signal 1040 and translate signal 1040 from a serial data stream to a parallel data stream. The resulting signal 1045 can be a decoded, 8-bit, parallel signal, e.g., a parallel data stream that is no longer biphase encoded. Signal 1045 can be provided to the counter 1010 and the control bit extraction module 1025.

In one embodiment, the deserializer and decoder 1005 can include a preamble detection unit. The preamble detection unit can identify preambles within signal 1040 by comparing groups of biphase units, e.g., eight biphase units, with the predetermined or known preamble patterns as described herein. The deserializer and decoder 1005 can detect preambles and acquire frame lock on signal 1040 by comparison of portions of the signal 1040 with the predetermined preambles as well as by utilizing a count of bits provided by the counter 1010 to be described in greater detail. In another embodiment, the deserializer and decoder 1005 can include an internal biphase unit counter that counts biphase units for purposes of synchronization. Still, as noted, the particular manner in which the controller 1000 is frame locked or synchronized to signal 1040 is not intended to limit the embodiments disclosed herein.

The counter 1010 can continually count bits within signal 1045, as signal 1045 is no longer biphase encoded. As shown, the counter 1010 can generate signal 1050 which can be output to the deserializer and decoder 1005, the control bit extraction module 1025, and the diagnostic circuit 1030. Signal 1050 can specify count information. For instance, signal 1050 can specify a bit count, indicate when frames are detected, e.g., when 512 bits corresponding to 1024 biphase units have been counted, and the like. In this regard, counting bits or biphase units can be interchangeable in terms of detecting frame boundaries.

Based upon the information specified in signal 1050, the control bit extraction module 1025 can locate one or more selected control bits within frames identified within signal 1045. For example, the control bit extraction module 1025 can identify the arbitration bit, the bundle bit, or both within frames within signal 1045 based upon count information within signal 1050. The control bit extraction module 1025 can extract the arbitration bit, the bundle bit, or both the arbitration bit and the bundle bit from each frame and provide the extracted information to the diagnostic circuit 1030 within signal 1055.

Utilizing the count information within signal 1050, the diagnostic circuit 1030 can count the number of consecutive frames having a bundle bit that is set to determine a frame count. The frame count indicates the number of consecutive frames that have been received within signal 1040 that have the bundle bit set. A set bundle bit within a frame indicates that the frame is one of a plurality of frames carrying a portion of a packet of data. A set bundle bit indicates that the asynchronous field, e.g., the shared channel, is locked and unavailable. The diagnostic circuit 1030 can correlate the data received within signal 1050 with the control bit information received within signal 1055 to calculate, or determine, the frame count. When the number of consecutive frames having a set bundle bit exceeds a maximum threshold, which also may be stored within the diagnostic circuit 1030, the diagnostic circuit 1030 can detect a deadlock state. Responsive to detecting the deadlock state, the diagnostic circuit 1030 can generate and output an indication of the deadlock state within signal 1060 to the recovery circuit 1015.

Responsive to signal 1060 indicating that the diagnostic circuit 1030 has detected a deadlock state, the recovery circuit 1015 can reset one or more selected control bits within one or more frames. As pictured, the counter 1010 can replicate and/or output data stream 1045, thereby making data stream 1045 available to the recovery circuit 1015. Responsive to signal 1060 indicating a deadlock state, the recovery circuit 1015 can reset, e.g., set to zero, the bundle bit, the arbitration bit, or both the bundle bit and the arbitration bit within one or more frames. The recovery circuit 1015 can generate and output a signal 1070 specifying a modified version of the current frame where the control bit or bits have been reset. For example, the recovery circuit 1015 can output signal 1070 specifying a frame that includes a bundle bit and an arbitration bit that have been set to zero.

As shown, signal 1070 can be output to the biphase encoder 1020, which can convert signal 1070 from a parallel data stream to a serial data stream and further biphase encode signal 1070. Accordingly, signal 1075, which can be output from biphase encoder 1020, can be a biphase encoded, serial, data stream, similar to signal 1040. The recovery circuit 1015 can generate and output a control signal 1065 to the multiplexer 1035. Control signal 1065 can instruct the multiplexer 1035 whether to pass signal 1075, including the modified version of the current frame, or signal 1040, including the original, or unmodified, current frame, based upon whether one or more control bits have been reset. For example, the recovery circuit can time control signal 1065 to instruct the multiplexer 1035 to pass signal 1075 so that the modified frame with reset control bits is passed and output within signal 1080. Once the modified frame, or frames, pass, the control signal 1065 can be changed by the recovery circuit 1015 to instruct the multiplexer to pass signal 1040, which can be output as signal 1080.

The frame, or frames, to follow the modified frame having both the bundle bit and the arbitration bit set to zero also will have the bundle and arbitration bits set to zero indicating the availability of the asynchronous channel. This will release the deadlock condition. For example, the control bits can remain cleared until another node in the MOST network acquires control of the asynchronous channel. In one embodiment, one modified frame can be output, where the single modified frame can clear the deadlock condition. The cleared control bits can be carried over in further frames by network nodes until a node acquires control of the asynchronous channel.

In another embodiment, the recovery circuit 1015 can modify two or more frames to include cleared control bits and multiplexer 1035 can be instructed, via signal 1065, to output each of the modified frames having the control bits cleared, e.g., two or more modified frames. In still another embodiment, the recovery circuit 1015 can clear the bundle bit in a first frame and clear the arbitration bit in a frame immediately following the frame with the cleared bundle bit. Accordingly, both modified frames can be output.

Figure 11:
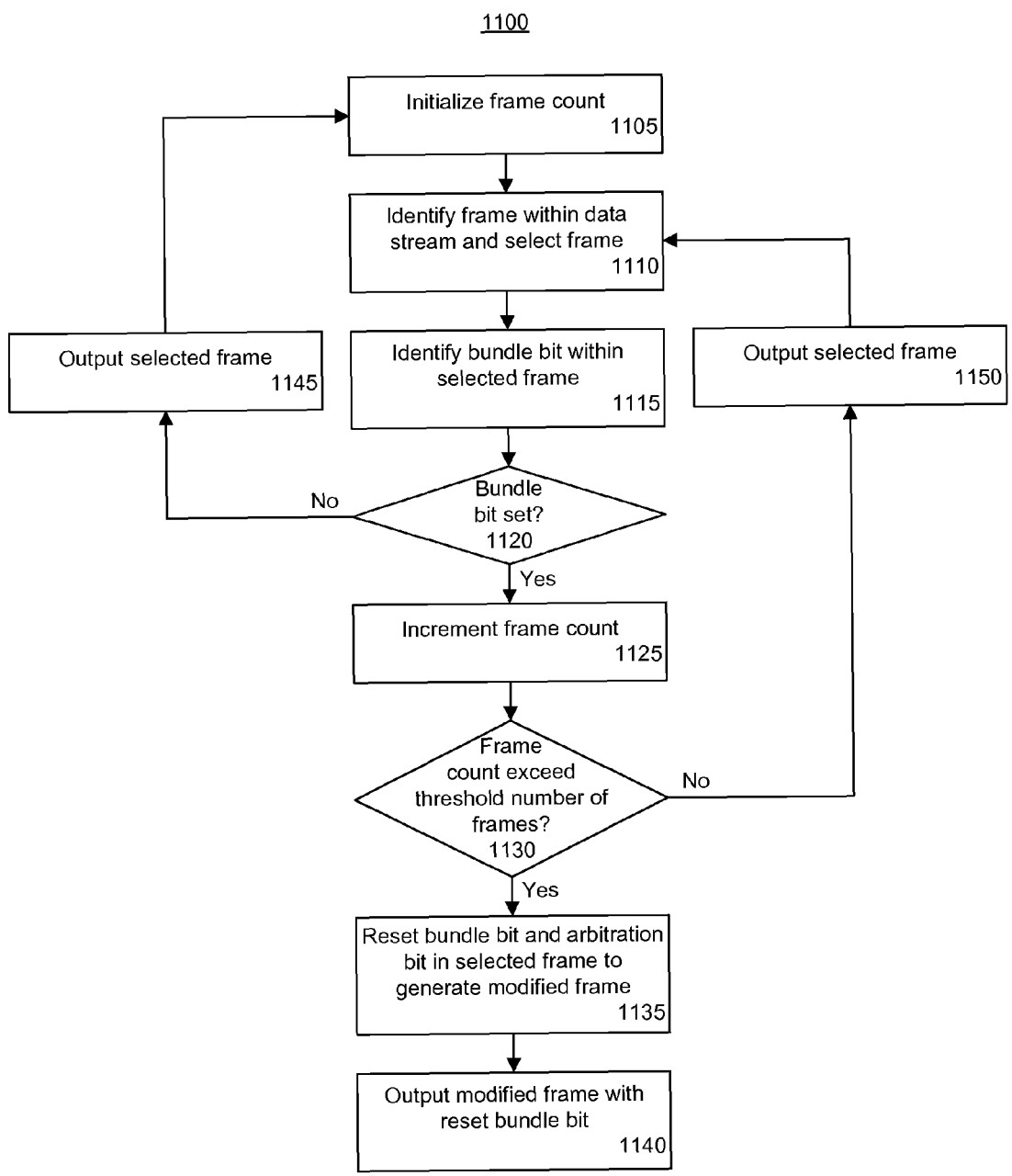
FIG. 11 is a flow chart illustrating a method of recovering a shared channel from a deadlock state within a MOST network in accordance with another embodiment of the present invention.

FIG. 11 is a flow chart illustrating a method 1100 of recovering a shared channel from a deadlock state within a MOST network in accordance with another embodiment of the present invention. The method 1100 can be implemented using a controller as described herein. The method 1100 can begin in a state where the controller has acquired at least frame lock or full synchronization on the data stream within the MOST network.

Beginning in step 1105, the controller can initialize a frame count. The frame count can indicate the number of consecutive frames that have been identified as including a control bit, e.g., the bundle bit, that is set. It should be appreciated that while the method 1100 is described as using a frame count or a biphase unit count, a bit count also can be used. In that case, rather than determining whether the frame count exceeds some maximum allowable frame count, the controller can determine whether the number of bits or biphase units counted exceeds some maximum number of bits or biphase units that, when converted into a frame count, is equivalent to the maximum number of allowable frames.

In step 1110, the controller can detect a frame within the data stream and select the frame. In step 1115, the controller can identify the bundle bit within the selected frame. In step 1120, the controller can determine whether the bundle bit within the selected frame has been set. If not, the method can continue to step 1145, where the selected frame can be output, e.g., without modification. The method can continue to loop back to step 1105 where the frame count can be initialized, or reset. When a frame includes a bundle bit that is not set, and the frame count has not reached the threshold number of frames for establishing a deadlock state, no deadlock state exists and the frame count can be reset to zero.

When the bundle bit is set, the method can proceed to step 1125. In step 1125, the frame count can be incremented. In step 1130, the controller can determine whether the frame count exceeds a threshold number of frames. In one embodiment, the threshold number of frame can be set to 255 frames. When the frame count exceeds the threshold number of frames, the controller can determine that a deadlock state has been detected. Accordingly, the method can proceed to step 1135. When the frame count does not exceed the threshold number of frames, the controller can determine that a deadlock state has not been detected. In that case, the method can continue to step 1150 where the selected frame can be output without modification. The method can then loop back to step 1110 to detect further frames.

In step 1135, the controller can reset the bundle bit and the arbitration bit in the selected, or current, frame. That is, the controller can set the bundle bit of the selected frame to zero. The controller further can set the arbitration bit in the selected frame to zero. Resetting the bits in this manner generates a modified version of the selected frame that includes a cleared bundle bit and a cleared arbitration bit. In step 1140, the controller can output the modified frame with the bundle bit and the arbitration bit both set to zero in place of the original, or unmodified, selected frame. As illustrated with respect to FIG. 10, the controller can use a multiplexer to replace the original selected frame with the modified frame including the reset bundle and arbitration bits. The modified frame can be output to other nodes within the MOST network, thereby clearing the deadlock state on the shared channel. The cleared control bits can be carried over in further frames until a node acquires control of the asynchronous channel.

As noted, in another embodiment, more than one modified frame, where each modified frame includes a cleared bundle bit and a cleared arbitration bit, can be output from the controller to clear the deadlock condition. Once cleared, the control bits can remain cleared within frames in the MOST network until such time that a node takes control, or acquires control, of the asynchronous channel. In still another embodiment, the controller can clear the bundle bit in the current frame and the arbitration bit in the next consecutive frame.

The flowchart in the figure illustrates the architecture, functionality, and operation of possible implementations of systems, methods and computer program products according to various embodiments of the present invention. In this regard, each block in the flowchart may represent a module, segment, or portion of code, which comprises one or more portions of computer-usable program code that implements the specified logical function(s).

It should be noted that, in some alternative implementations, the functions noted in the blocks may occur out of the order noted in the figure. For example, two blocks shown in succession may, in fact, be executed substantially concurrently, or the blocks may sometimes be executed in the reverse order, depending upon the functionality involved.

It also should be noted that each block of the flowchart illustration, and combinations of blocks in the flowchart illustration, can be implemented by special purpose hardware-based systems that perform the specified functions or acts, or combinations of special purpose hardware and computer instructions. For example, the various blocks of the flowchart represent functions that may be implemented by one or more of the various components of the controller disclosed herein. As the flow chart seeks to illustrate the overall functionality of the controller, it is provided for purposes of illustration only.

The quantities in terms of thresholds, number of bits or bytes in a frame, number of frames in a block, number of blocks in a super block, etc., have been used for purposes of illustration. It should be appreciated that the particular quantities involved may vary according to the particular version of the MOST specification for which a controller configured in accordance with the embodiments disclosed herein is implemented.

Embodiments of the present invention can be realized in hardware, software, or a combination of hardware and software. The embodiments can be realized in a centralized fashion in one data processing system or in a distributed fashion where different elements are spread across several interconnected data processing systems. Any kind of data processing system or other apparatus adapted for carrying out the methods described herein is suited. A typical combination of hardware and software can be a general-purpose computer system with a computer program that, when being loaded and executed, controls the computer system such that it carries out the methods described herein.

A data processing system, e.g., a computer or computer system, suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices such as, for example, keyboards, displays, pointing devices, etc., can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

Embodiments of the present invention further can be embedded in a computer program product, which comprises all the features enabling the implementation of the methods described herein. The computer program product can include a computer-usable or computer-readable medium having computer-usable program code which, when loaded in a computer system, causes the computer system to perform the functions described herein. Examples of computer-usable or computer-readable media can include, but are not limited to, optical media, magnetic media, computer memory, one or more portions of a wired or wireless network through which computer-usable program code can be propagated, or the like.

The terms "computer program," "software," "application," "computer-usable program code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, a computer program can include, but is not limited to, a subroutine, a function, a procedure, an object method, an object implementation, an executable application, an applet, a servlet, a source code, an object code, a shared library/dynamic load library and/or other sequence of instructions designed for execution on a computer system, hardware description language (HDL), a bitstream for programming an IC, or the like.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, although not necessarily directly, and not necessarily mechanically, e.g., communicatively linked through a communication channel or pathway or another component or system.

The embodiments disclosed herein can be embodied in other forms without departing from the spirit or essential attributes thereof. Accordingly, reference should be made to the following claims, rather than to the foregoing specification, as indicating the scope of the various embodiments of the present invention.

What is claimed is:

1. A method of recovering a shared channel from a deadlock state within a network, the method comprising:
   identifying frames within a data stream within the network, wherein the network has a ring topology and a shared channel usable by nodes of the network when not in a busy state;
   detecting a deadlock state, in which a node of the network does not release the shared channel, according to whether a number of consecutive frames within the data stream comprising at least one control bit indicating a busy state of the shared channel exceeds a maximum allowed number of frames indicating the busy state;
   responsive to detecting the deadlock state, adjusting the at least one control bit within a current frame within the data stream, wherein adjusting the at least one control bit clears the deadlock state and generates a modified frame; and
   outputting the modified frame to at least one node within the network.

2. The method of claim 1, wherein detecting a deadlock state comprises:
   determining a frame count by counting consecutive frames comprising a set bundle bit; and
   determining whether the frame count exceeds a maximum allowed number of frames.

3. The method of claim 2, further comprising initializing the frame count responsive to identifying a frame comprising a cleared bundle bit.

4. The method of claim 2, further comprising:
   determining that the frame count exceeds the maximum allowed number of frames;
   clearing the bundle bit within the current frame; and
   initializing the frame count.

5. The method of claim 4, further comprising clearing an arbitration bit within the current frame.

6. The method of claim 1, wherein identifying frames within a data stream within the network comprises:
   detecting a first preamble and a second preamble separated by a number of biphase units that corresponds to a frame;
   determining that no biphase coding violation exists between the first preamble and the second preamble; and
   acquiring frame lock on the data stream.

7. The method of claim 1, wherein identifying frames within a data stream within the network comprises:
   determining a count of bits; and
   detecting frame boundaries when the count of bits reaches a number corresponding to a number of bits within a frame.

8. A controller that recovers a shared channel from a deadlock state within a network, the controller comprising:
   a counter that counts bits within a data stream within the network, wherein the network has a ring topology and a shared channel usable by nodes of the network when not in a busy state;
   a control bit extraction module locating a first control bit within frames according to the counter and identifying a state of the first control bit within the frames within the data stream;
   a diagnostic circuit configured to detect a deadlock state, in which a node of the network does not release the shared channel, by determining a number of consecutive frames comprising the first control bit indicating a busy state of the shared channel, wherein the diagnostic circuit compares the number of consecutive frames with a predetermined threshold number of frames;
   a recovery circuit, responsive to the number of consecutive frames exceeding the predetermined threshold number of frames, generating a modified frame from a selected frame by adjusting the first control bit and a second control bit within the selected frame to indicate a free state of the shared channel;
   a biphase encoder biphase encoding the modified frame; and
   a multiplexer selectively outputting the biphase encoded, modified frame to at least one node within the network.

9. The controller of claim 8, wherein the recovery circuit generates a control signal that controls whether the multiplexer passes the biphase encoded, modified frame or the selected frame.

10. The controller of claim 9, wherein the recovery circuit causes the multiplexer to output the modified frame responsive to adjusting the first control bit and the second control bit to generate the modified frame.

11. The controller of claim 8, wherein the recovery circuit generates the modified frame to include an arbitration bit as the second control bit.

12. The controller of claim 8, wherein the controller is frame locked, wherein the control bit extraction module determines a location of the control bit within each frame according to a count of bits determined by the counter.

13. The controller of claim 12, wherein the first control bit is a bundle bit and the second control bit is an arbitration bit.

14. A computer program product comprising:
a non-transitory computer-usable medium comprising computer-usable program code that implements a circuit design for a controller within a programmable integrated circuit, the computer-usable medium comprising:
computer-usable program code that identifies frames within a data stream within a network, wherein the network has a ring topology and a shared channel usable by nodes of the network when not in a busy state;
computer-usable program code that detects a deadlock state, in which a node of the network does not release the shared channel, according to whether a number of consecutive frames comprising at least one set control bit indicating a busy state of the shared channel exceeds a maximum allowed number of frames indicating a busy state;
computer-usable program code that, responsive to detecting the deadlock state, adjusts the at least one control bit within a current frame, wherein adjusting the at least one control bit clears the deadlock state and generates a modified frame; and
computer-usable program code that outputs the modified frame to at least one node within the network.

15. The computer program product of claim 14, wherein the computer-usable medium further comprises:
computer-usable program code that determines a frame count by counting consecutive frames comprising a set bundle bit; and
computer-usable program code that determines whether the frame count exceeds a maximum allowed number of frames.

16. The computer program product of claim 15, wherein the computer-usable medium further comprises computer-usable program code that initializes the frame count responsive to identifying a frame comprising a cleared bundle bit.

17. The computer program product of claim 15, wherein the computer-usable medium further comprises:
computer-usable program code that determines that the frame count exceeds the maximum allowed number of frames;
computer-usable program code that clears the bundle bit within the current frame; and
computer-usable program code that initializes the frame count.

18. The computer program product of claim 17, wherein the computer-usable medium further comprises computer-usable program code that clears an arbitration bit within the current frame.

19. The computer program product of claim 14, wherein the computer-usable program code that identifies frames within a data stream within the network comprises:
computer-usable program code that detects a first preamble and a second preamble separated by a number of biphase units that corresponds to a frame;
computer-usable program code that determines that no biphase coding violation exists between the first preamble and the second preamble; and
computer-usable program code that acquires frame lock on the data stream.

20. The computer program product of claim 14, wherein the computer-usable program code that identifies frames within a data stream of the network comprises:
computer-usable program code that determines a count of bits; and
computer-usable program code that detects frame boundaries when the count of bits reaches a number corresponding to a number of bits within a frame.

* * * * *